United States Patent
Arnold, III (10) Patent No.: US 10,272,448 B1
(45) Date of Patent: Apr. 30, 2019

(54) CENTRIFUGE FOR SEPARATING OR CLARIFYING FOOD OR BEVERAGE PRODUCTS

(71) Applicant: Booker & Dax, LLC, New York, NY (US)

(72) Inventor: David E. Arnold, III, New York, NY (US)

(73) Assignee: BOOKER & DAX, LLC, New York, NY (US)

(*) Notice: Subject to any disclaimer, the term of this patent is extended or adjusted under 35 U.S.C. 154(b) by 51 days.

(21) Appl. No.: 15/400,787

(22) Filed: Jan. 6, 2017

Related U.S. Application Data (60) Provisional application No. 62/276,764, filed on Jan. 8, 2016.

(51) Int. Cl.

| | |
|---|---|
| *B04B 1/00* | (2006.01) |
| *B04B 11/02* | (2006.01) |
| *A23L 2/70* | (2006.01) |
| *A23L 5/30* | (2016.01) |
| *B04B 7/06* | (2006.01) |
| *B04B 7/10* | (2006.01) |

(52) U.S. Cl.
CPC ............ *B04B 11/02* (2013.01); *A23L 2/70* (2013.01); *A23L 5/30* (2016.08); *B04B 7/06* (2013.01); *B04B 7/10* (2013.01); *A23V 2002/00* (2013.01)

(58) Field of Classification Search
CPC ... B04B 11/02; B04B 7/06; B04B 7/10; A23L 5/30; A23L 2/70; A23V 2002/00
See application file for complete search history.

(56) References Cited

U.S. PATENT DOCUMENTS

| | | | | |
|---|---|---|---|---|
| 3,986,663 A | * | 10/1976 | Jonsson | B04B 1/18 494/3 |
| 6,162,163 A | * | 12/2000 | Karlsson | B04B 1/08 494/70 |
| 2011/0212820 A1 | * | 9/2011 | Klintenstedt | B04B 9/04 494/46 |

FOREIGN PATENT DOCUMENTS

| | | | |
|---|---|---|---|
| DE | 202004018743 | * | 5/2006 |
| SU | 1421414 | * | 9/1988 |

OTHER PUBLICATIONS

English translation of DE202004018743, published May 2006.*
English translation of SU1421414, published Sep. 1988.*

* cited by examiner

*Primary Examiner* — Anthony J Weier
(74) *Attorney, Agent, or Firm* — Knobbe, Martens, Olson & Bear, LLP (57) ABSTRACT

A centrifuge for separating food and beverage products can include a base and an outer housing connected to the top end of the base. The outer housing can include an outlet through which liquid may be dispensed. A rotor may be positioned within the outer housing and can include an annular rotor wall an opened top end, and a closed bottom end defining a lower end of the annular rotor wall. A motor can be operably connected to the rotor and configured to rotate the rotor about an axis of rotation at oscillating rotational speeds. The annular rotor wall can extend upward and radially outward with respect to the axis of rotation from the lower end of the annular rotor wall. The annular rotor wall can extend downward and radially outward with respect to the axis of rotation from the upper end of the annular rotor wall.

16 Claims, 10 Drawing Sheets

CENTRIFUGE FOR SEPARATING OR CLARIFYING FOOD OR BEVERAGE PRODUCTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

A centrifuge is a device with a rapidly rotating container that applies centrifugal force to its contents, typically to separate materials of different densities. Centrifuges are used in many industries and contexts, perhaps most commonly in laboratories. Typically, laboratory centrifuges are large and expensive relative to the amount of material that may be processed. For example, a centrifuge that utilizes test tubes to process relatively small amounts of content (on the order of 10 to 50 milliliters) is typically available for hundreds of dollars, and can be suitable for countertop use (e.g., roughly one cubic foot in size and 10 kilograms in mass). Centrifuges capable of processing larger amounts of content (on the order of 1 to 3 liters) often utilize a design of fixed or swinging buckets, are available at significantly higher prices (in range of multiple thousands of dollars), and are not suitable for countertop use (as they are typically many cubic feet in size and have a mass of over 100 kilograms).

Centrifuges are also used in non-laboratory environments. For example, restaurants and bars use centrifuges to separate liquid suspensions, such as to clarify juices (by removing pulp or fruit solids), remove solids from nut milks, and to separate fats from solids in pureed foods. Centrifuges can be superior to traditional separation methods, such as filtering, in that separation can be achieved very quickly and without the use of filters that are prone to clogging. In some instances, centrifuges can produce results not obtainable by traditional separation methods. For example, it may be difficult or impossible to remove fats from some pureed foods (particularly vegetable-based purees) under traditional methods. Because of the improved ability of centrifuges to separate particulates from liquid, centrifuges can also reduce the need to use chemical or enzymatic aids in clarifying or separating liquids (though in some instances, superior results can be achieved by using chemical or enzymatic aids in addition to a centrifuge).

Use of centrifuges has enabled restaurants and bars to provide, on a commercial level, products that were previously not widely available. For example, centrifuges can enable bars to obtain clarified citrus juices, which can be directly carbonated into beverages (such as cocktails). Such direct carbonation does not typically produce adequate results when applied to non-clarified citrus juices, as the particulate matter of the juices provides nucleation sights for dissolved carbon dioxide, reducing the ability of a liquid to retain carbonation.

Laboratory centrifuges can be difficult or problematic to utilize outside a laboratory environment, and particularly bars or restaurants. While smaller countertop centrifuges are similar in size to many kitchen appliances, they process very small amounts of liquid, such that use in a commercial restaurant or bar is difficult. These small centrifuges also often utilize test tubes, which can be difficult to clean and prone to breakage, especially in busy kitchen environments. Larger centrifuges require much more significant investments in terms of money, space, and maintenance, and are thus not obtainable by many restaurants and bars. For both countertop and larger centrifuges, expertise may be required to operate the centrifuge to produce satisfactory results without damaging the device. For example, while a centrifuge may successfully separate liquids (or solids from liquids) during operation, careful harvesting of the desired product (e.g., liquid of a desired density or a separated solid) may be required to avoid re-combination with other portions. Further, most centrifuges require that different containers be loaded with equal weights of liquid, such that the machine remains balanced during spinning. Misuse of a centrifuge can damage the unit, and in some instances result in catastrophic failure. Such failures may be hazardous, particularly in the context of larger centrifuges where failure may result in a container exiting the unit at high speed. These difficulties have, until now, limited the adoption of centrifuges outside of laboratories.

BRIEF DESCRIPTION OF THE DRAWINGS

Various embodiments are depicted in the accompanying drawings for illustrative purposes, and should in no way be interpreted as limiting the scope of the embodiments. In addition, various features of different disclosed embodiments can be combined to form additional embodiments, which are part of this disclosure.

The drawing showing certain embodiments can be semi-diagrammatic and not to scale and, particularly, some of the dimensions are for the clarity of presentation and are shown greatly exaggerated in the drawings.

DETAILED DESCRIPTION

Generally described, the present disclosure relates to a centrifuge configured to process relatively high volumes of content relative to its size and weight, when compared to prior devices. The centrifuge described herein may be particularly suited to use outside of the laboratory environment, such as in restaurants, bars, or home kitchens. In one embodiment, the centrifuge may include a single toroidal rotor, to which a suspension or multi-density liquid may be added. The rotor may have a capacity of at least 100 milliliters, at least 250 milliliters, or at least 500 milliliters, while having a size and weight suitable for countertop use. The rotor may be shaped to encourage stable formation of a "pellet" at an outer circumference of the rotor. As used herein, the term pellet generally refers to a mass of solid or semi-solid matter that forms when a suspension of particulate in liquid is spun under centrifugal force, such that separated or clarified liquid can be removed from the rotor with little or no disturbance of the pellet. Specifically, the rotor may have an outer wall that, when viewed at vertical cross section, begin at a top and bottom of the rotor and extend outward at an angle until joining at or near the center of the outer wall. During operation, higher density matter may impact the angled outer wall (under centrifugal force) and be forced, by virtue of the angle, toward the largest circumference of the rotor to form a pellet (which in this instance may refer to a ring of matter forced against the largest circumference of the inner cavity of the rotor). Due to the unique shape of the rotor, the centrifuge as described herein may enable the formation of a stable pellet at much lower rotations per minute (rpms) than would be required to form a stable pellet in other configurations. For example, the centrifuge may operate to clarify most common kitchen foods or beverages at around 4000 rpms. This may reduce the cost and complexity of the device relative to centrifuges required to operate at higher rpms.

To increase efficiency of operation and reduce complexity of use, the centrifuge described herein may be self-balancing, and operate during use to encourage relatively even distribution of particulate within the rotor. Without such even distribution, the rotor may become unbalanced, resulting in unnecessary wear on the unit. In one embodiment, the centrifuge may encourage self-balancing by varying an rpm at which the rotor spins, agitating the contents to encourage even distribution by varying centrifugal and angular force. Such varying rate of spin can also increase the efficiency of pellet creation in the rotor. To further increase the self-balancing aspects of the centrifuge described herein, the rotor may include one or more fins extending radially from an axis of rotation toward an outer wall of the rotor. Such fins can agitate the spinning contents to encourage equal distribution. To ensure that the fins do not prohibit equal distribution by inhibiting flow of liquid around an outer wall of the rotor, the fins may not cover the entire outer wall of the rotor, but may instead allow "gaps" or "holes" with the outer wall, such that during operation liquid can travel around an entire circumference of the rotor. The fins may in some instances be removable from the rotor to facilitate easy cleaning of both the fins and the rotor. In one embodiment, a height of the fins may indicate an operational volume of the rotor. For example, where the rotor has an operational volume of 750 ml when rotating, the fins may indicate (e.g., via their total height or other markings) under non-rotating conditions when liquid has reached a volume of 750 ml within the rotor.

In some embodiments, the centrifuge described herein may be configured to operate in either "batch" or "continuous" mode. Batch mode generally refers to an instance in which a single batch of unprocessed liquid (e.g., a suspension of particles, including fats, solids, etc., in liquid) is placed into the rotor, the rotor is spun to separate particulate from the base liquid (or to separate liquids of varying densities), and the separated contents are removed. Continuous mode generally refers to an instance in which unprocessed liquid is added to the rotor while the rotor is spinning, and the centrifuge operates to output a lowest density liquid (e.g., clarified juice) when a threshold volume of total product is reached in the rotor (e.g., equal to an operational volume of the rotor). In this mode, new unprocessed liquid may be continuously added, while processed liquid is expelled, thus enabling larger volumes of liquid to be processed than would be possible in a single batch. Generally, continuous mode operation may continue until an amount of non-output matter, such as a fat or solid forming a pellet, reaches the threshold volume, at which point such matter would be removed from the rotor (or risk output with a lowest density liquid). For unprocessed liquids with a relatively low solids content, such as lime juice, continuous mode operation can enable very large volumes of unprocessed liquid to be separated during one continuous use of the centrifuge.

To enable continuous mode use, the centrifuge may be configured to enable injection of unprocessed liquid into the rotor during operation in a manner that does not inhibit removal of low density (e.g., clarified) product. For example, when the rotor is spinning, contents may be pressed via centrifugal force against an outer wall of the rotor, resulting in a "surface" of liquid facing toward an axis of rotation of the rotor. The rotor may be configured such that when this surface reaches a threshold distance from the axis of rotation, excess contents (which would be expected to be of a minimum density) are allowed to "overflow" out of the rotor and be removed from the centrifuge. If unprocessed liquid were added to the rotor near the axis of rotation, that liquid may intersect the surface of the spinning liquid, and potentially be expelled from the rotor. To prevent this undesirable occurrence, the centrifuge may include one or more input tubes that enable unprocessed liquid to travel from an input, such a filling cavity near the top of the centrifuge, into the rotor and to a point past the threshold distance from the axis of rotation. Thus, the unprocessed liquid would not be expected to exit the rotor during operation (unless excess unprocessed liquid is added to the rotor).

To further facilitate continuous mode use, the centrifuge may include a pump configured to move liquid from a container (e.g., external to the centrifuge or integrated with the centrifuge) into the rotor through the input tubes. In one embodiment, the pump is a peristaltic pump, examples of which are known in the art. As would be appreciated by one skilled in the art in view of the disclosure herein, a peristaltic pump can enable movement of unprocessed liquid through a tube, without exposing unprocessed liquid to any mechanical parts of the pump excepting the tube. Particularly in food and beverage applications, use of a peristaltic pump can ensure sanitary operation of the centrifuge and aid in cleaning the pump between uses.

As used herein, "content" or "product" can refer to matter processed with respect to the centrifuge, which may include un-clarified matter added to a centrifuge for clarification and clarified matter removed from the centrifuge. Product may, by way of non-limiting example, be liquids containing particulate matter or other solids that can be removed by use of a centrifuge. Product may also be purees, blends, gels, suspensions, or other semi-liquid matter such as a "fluid gel" created by the addition of hydrocolloids (such as agar) to liquids. As used herein, "clarified" may refer to product that is clear to the desired extent of the end user (e.g., clear enough to read newsprint through at least 20 millimeters of the fluid). The term "pellet" can refer to solids that are deposited onto the inner surface of an annular wall of the rotor that do not re-suspend into product when the centrifuge has stopped and can be harvested by the operator. The term "solid" or "solids" can refer to particulate or other matter than is removed from un-clarified product via the centrifuge. Solids may include "sludge" or other semi-solid matter. In some instances, solids may include a mix of particulate matter and liquid (e.g., at a higher concentration of particulate matter than the unclarified product introduced into the centrifuge), or may include semi-solid lipids or combination of lipids and other liquid (e.g., a combination of butter fat and water). The term solids, as used herein, is not intended to necessarily refer to product that is necessarily free of any liquid.

The foregoing aspects and many of the attendant advantages of the present disclosure will become more readily appreciated as the same become better understood by reference to the following, when taken in conjunction with the accompanying drawings With reference to FIGS. 1-1B, an embodiment of a centrifuge assembly 1 for clarifying and/or separating food product components will be described. The assembly 1 can include a base 3. The base 3 can be configured to sit on a working surface such as a counter, table, or other surface. In some applications, the base 3 can be mountable to a vertical surface such as a wall, cabinet, etc. In some embodiments, the base 3 includes one or more switches 5, knobs, displays, buttons, lights, and/or other user input or assembly status features.

The centrifuge assembly 1 can include a processing portion 7. Some or all of the components of the processing portion 7 can be attachable to the base 3. For example, the processing portion 7 can include an outer housing 11. A rotor 12 can be positioned within the outer housing 11. In some embodiments, the processing portion 7 includes a rotor inlet assembly 14. The outer housing 11 may be stationary with respect to the base 3 during operation of the centrifuge 1, while the rotor 12 and rotor inlet assembly 14 can be configured to rotate with respect to the base 3 during operation of the centrifuge 1.

In some embodiments, the outer housing 11 is constructed from a polymer, metal, ceramic, and/or some other suitable/food safe material. The material used for the outer housing 11 may have sufficient structural strength and/or toughness to contain malfunctioning rotor parts that may break apart within the outer housing 11 in the event of rotor 12 malfunction. In some embodiments, the material used for the outer housing 11 is configured to fail by deformation rather than shattering. Avoiding shattering of the outer housing 11 can reduce the risk of injury to a user of the centrifuge 1 in the event that the rotor 12 or some other component breaks apart or is otherwise projected outward from interior of the outer housing 11. The outer housing 11, or some portion thereof, can be transparent or translucent. Using a transparent or translucent material can help a user confirm correct operation of the centrifuge assembly 1.

The outer housing 11 can be configured to releasably or fixedly attach to the base 3. In some embodiments, the outer housing 11 connects or attaches to the base 3 via a bayonet fit, threaded engagement, frictional fit, detent fittings, and/or some other suitable structure or method of attachment. The outer housing 11 can include one or more vanes on an inner surface of an outer wall of the outer housing 11. The vanes can be configured to direct fluid downward after the fluid is ejected from the rotor 12. In some embodiments, the vanes are arranged vertically. The outer housing 11 can include a spout 13 or other outlet extending through an outer wall of the outer housing 11. Preferably, the spout 13 is positioned at or near a lower end of the outer wall of the outer housing 11. In some embodiments, the spout 13 is directed downward from the outer wall of the outer housing 11. Directing the spout 13 downward can enhance extraction of liquid from the outer housing 11 and can, in some applications, reduce the likelihood of spray (e.g., in a horizontal direction) from the spout 13 as a result of spinning of the rotor 12. As illustrated in FIG. 1B, the lower wall 25 of the outer housing 11 can slope downward from the center of the outer housing 11 toward the outer wall of the outer housing 11. Such a downward sloping lower wall 25 can enhance extraction and/or draining of the liquid in the housing 11 toward the spout 13. In some embodiments, the lower wall 25 has a helical shape such that the lowest point of the lower wall 25 is at or adjacent the spout 13.

Figure 1:
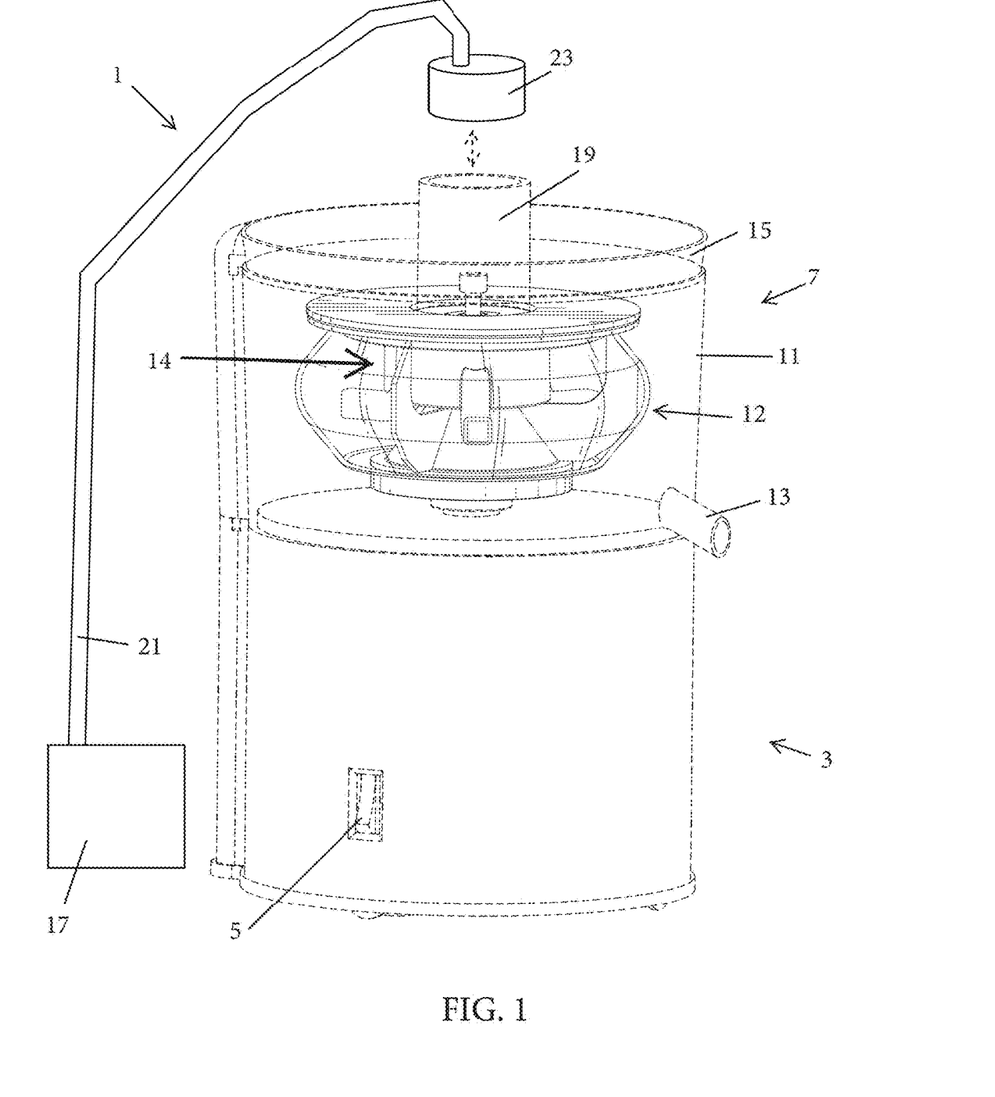
FIG. 1 is a front left perspective view of a centrifuge according to the present disclosure.
Figure 1A:
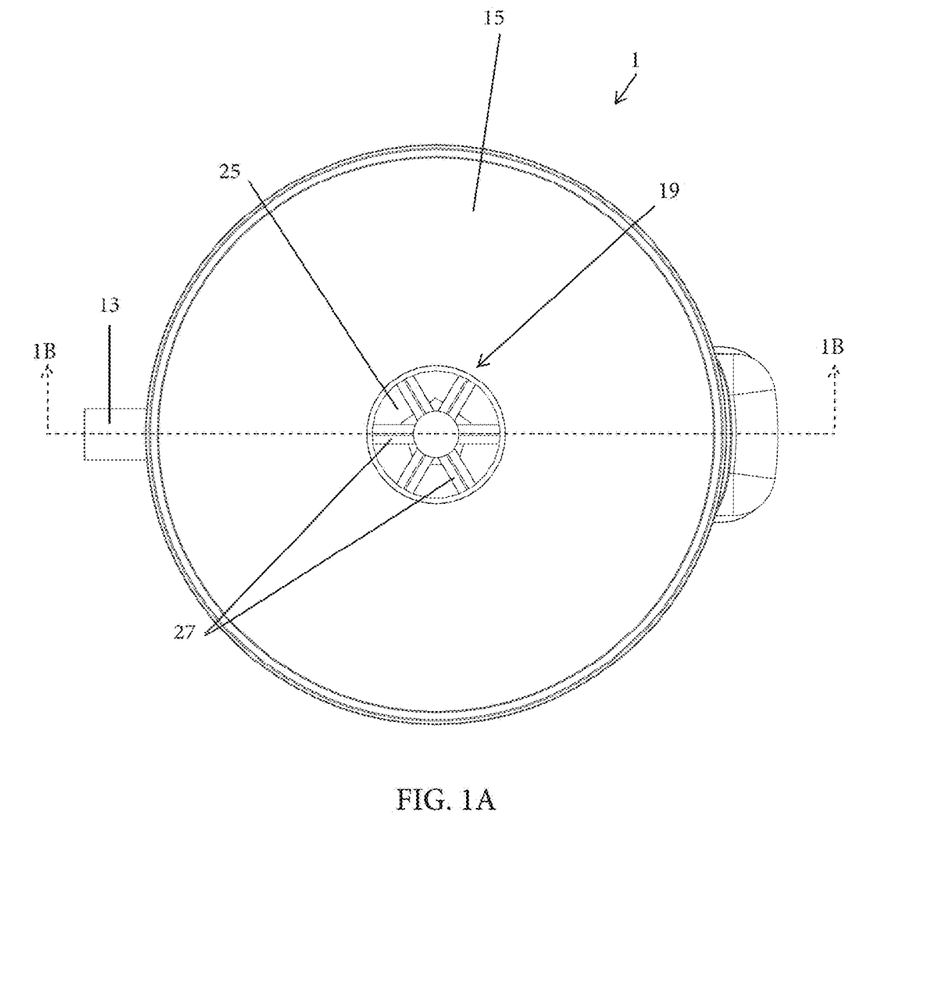
FIG. 1A is a top plan view of the centrifuge of FIG. 1.
Figure 1B:
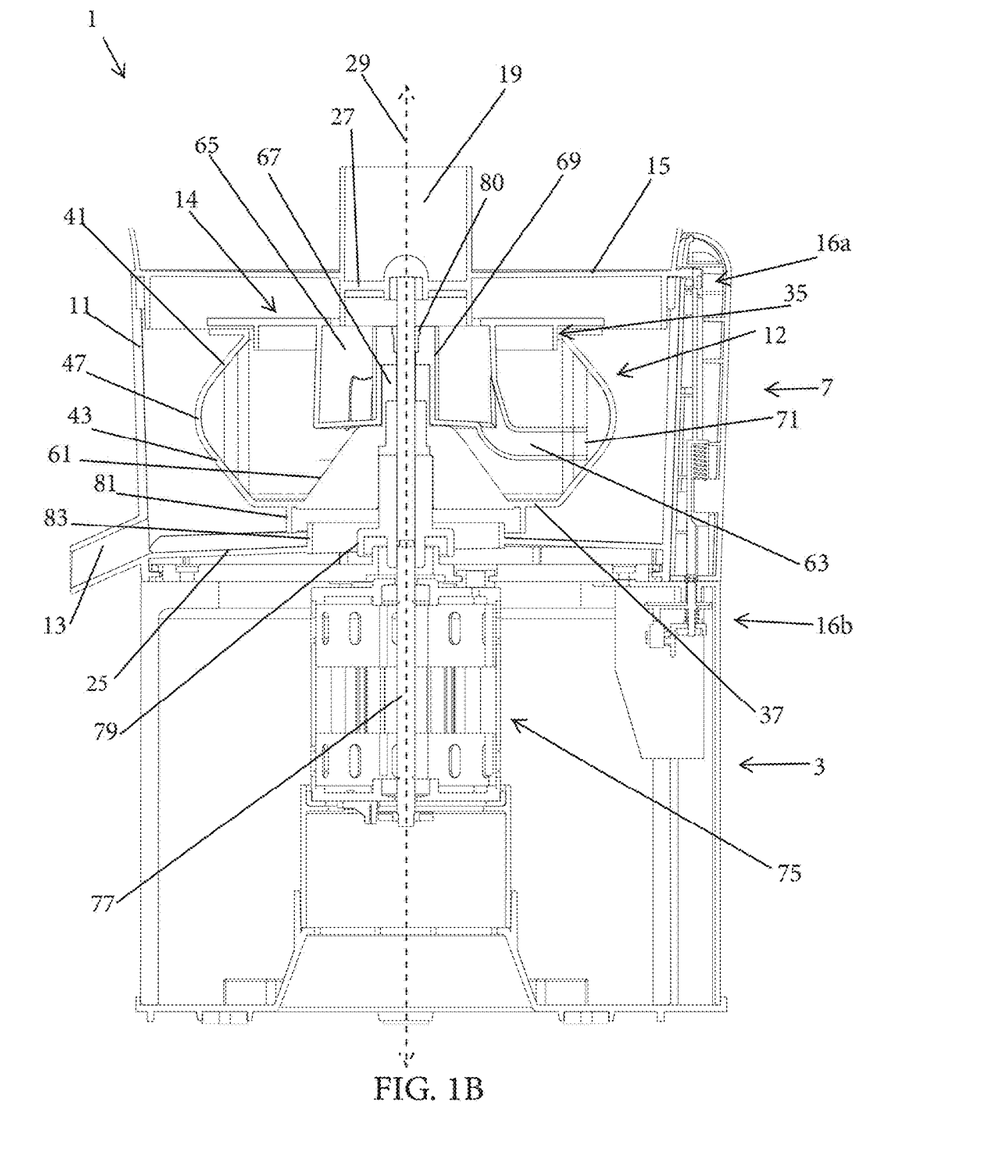
FIG. 1B is a cross-sectional view of the centrifuge of FIG. 1, taken along the cut plane 1B-1B of FIG. 1A.

Staying with the system illustrations in FIGS. 1-1B, the processing portion 7 can include a lid 15 configured to engage with an upper end of the outer housing 11. In some embodiments, the lid 15 is connected to the outer housing 11 via a hinge. In some embodiments, the lid 15 is configured to completely detach from the outer housing 11. The lid 15 can be configured to engage with the outer housing 11 via a bayonet fitting, threaded engagement, frictional fit, detent fittings, and/or some other suitable structure or method of attachment. In some embodiments, the centrifuge 1 can include a safety feature such as a sensor that detects when the lid 15 is closed. This safety feature can be a Hall Effect sensor, micro-switch, or other sensor that detects the orientation and/or position of the lid 15 with respect to the housing 11. In some configurations, the centrifuge 1 includes a sensor configured to monitor rotational speed of the rotor 12. The safety feature(s) may be configured to prevent operation (e.g., spinning of the rotor 12) when the lid 15 is opened to reduce the likelihood of injury during use of the centrifuge 1. The safety feature may be positioned adjacent the lid 15 (e.g., feature 16a) or within the base 3 (e.g., feature 16b). In some embodiments, the safety feature can inhibit or prevent opening of the lid 15 when the rotor 12 is spinning (e.g., at least when the rotor 12 is spinning above a threshold speed such as 100 rpm). For example, the centrifuge 1 can include a solenoid which locks the lid 15 in a closed position while the rotor 12 spins. The solenoid can be operably connected to a sensor configured to monitor rotational speed of the rotor 12. In some configurations, the solenoid is configured to unlock the lid in response to user input (e.g., pressing of a button or lever) only when the rotational speed of the rotor 12 is below a predetermined threshold (e.g., 100 rpm).

In some cases, the centrifuge includes a braking mechanism (e.g., an electronic braking mechanism) configured to stop rotation of the rotor 12 if a rotation sensor (e.g., a Hall Effect sensor) detects rotation above a threshold speed (e.g., 100 rpm) while the lid 15 is not fully attached to the outer housing 11. Another safety feature may include a light (e.g., an LED or xenon light) that strobes at a predetermined rate such as once per revolution of the rotor 12 when the rotor 12 is spinning such a light can help reduce the likelihood that a user of the centrifuge 1 will inadvertently open the lid 15 during operation. In some embodiments, the lid 15 and/or outer housing 11 are round, oval shaped, or polygonal shaped. In the illustrated embodiments, the outer housing 11 is cylindrical and the lid 15 is round.

Returning to the system illustration in FIG. 1, the centrifuge 1 can include a pump 17 that can be used to feed food/beverage product into the rotor 12. The pump 17 can be configured to add product to the rotor 12 at a predetermined rate to optimize centrifuge performance. Specifically, inputting product too quickly can cause overfilling of the rotor 12 and/or otherwise overload the centrifuge 1. Inputting product too slowly can waste time and effort. Input rate of the pump 17 may be controlled by a user of the centrifuge 1. For example, one or more knobs, switches, or other user inputs may be positioned on the centrifuge 1 or pump 17 to control the pumping rate. In some cases, adding product by hand (e.g., without a pump) can be difficult and/or prone to mistakes and misuse of the centrifuge 1.

The pump 17 can be, for example, a peristaltic pump. Other suitable pumps may also be used. For example, a gravity fed pump, a positive displacement piston pump, or a diaphragm pump may be used. In the case of a diaphragm pump, power can be provided to the pump via electrical power, batter power, $CO_2$, and/or some other source of power. The pump 17 can feed the product into the rotor 12 through, for example, a lid inlet 19 in the lid 15. The lid inlet 19 can be positioned at or near the center of the lid 15. For example, the lid inlet 19 can be positioned along an axis of rotation 29 of the rotor 12. The lid inlet 19 can comprise a hollow projection extending upward from the surrounding portions of the lid 15. As illustrated in FIG. 1B, the lid inlet 19 can include one or more openings bound by the wall of the lid inlet 19 and one or more inlet ribs 27. In one embodiment, a rate of operation of the pump 17 may be user-controllable, such as by operation of a knob or lever, or by programming of a microcontroller. Illustratively, the pump 17 may be controllable to vary a rate of pumping by altering a speed of operation of the pump, or by operating intermittently (e.g., providing a pulsating flow of liquid).

Returning to FIG. 1, in some embodiments, the pump 17 is configured to pump the food/beverage product through a feed tube 21. The feed tube 21 can be removable from the pump 17 to aid in cleaning. A fill cap 23 or other structure may be used to position the feed tube 21 in or near the lid inlet 19 of the lid. The fill cap 23 can be configured to mate with the lid inlet 19. In some embodiments, the feed tube 21 is positioned within or near the lid inlet 19 without use of a fill cap 23. For example, the feed tube 21 may be directly inserted into the rotor 12 and/or inlet assembly 14. In some embodiments, the pump 17 and/or feed tube 21 are positioned within a portion of the centrifuge 1 (e.g., within the base 3 and/or within the outer housing 11). In some embodiments, the pump 17 is mounted, either fixedly or releasably, to the base 3 and/or housing 11 via an attachment structure such as a clip, a detent fitting, a keyed fitting, a slot and rails, and/or any other structure or method of attachment.

Figure 2:
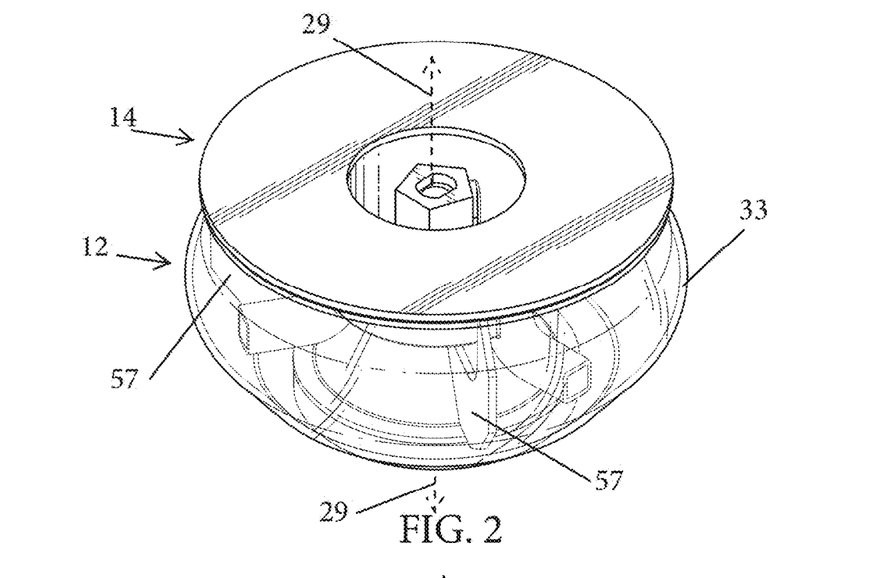
FIG. 2 is a top perspective view of a rotor and inlet assembly according to the present disclosure.

Moving now to FIGS. 2-9, further details of embodiments of a rotor 12 and rotor inlet assembly 14 will now be described. Other components of the centrifuge 1, such as the outer housing 11 and base 3 are removed from these Figures for clarity. As illustrated, the rotor inlet assembly 14 is positioned at least partially within the rotor 12 when the centrifuge 1 is assembled. In some cases, the centrifuge assembly 1 is used without the rotor inlet assembly 14. As illustrated in FIG. 2 the rotor 12 may be constructed from a transparent or translucent material. Using a transparent or translucent material can help a user of the centrifuge assembly 1 to confirm correct operation of the assembly 1. In some embodiments, the rotor 12 is constructed from a polymer, metal, ceramic, and/or some other food safe material. In some embodiments, the material used for the rotor 12 is configured to fail by deformation rather than shattering. The rotor 12 can have a total weight of less than about 18 ounces. In some embodiments, the total weight of the rotor 12 can be less than or equal to about 1 pound. Using a lightweight rotor 12 can reduce torque loading on the motor (described below) of the centrifuge 1 and can reduce damage to the outer housing 11 if the rotor 12 were to break apart.

Figure 3:
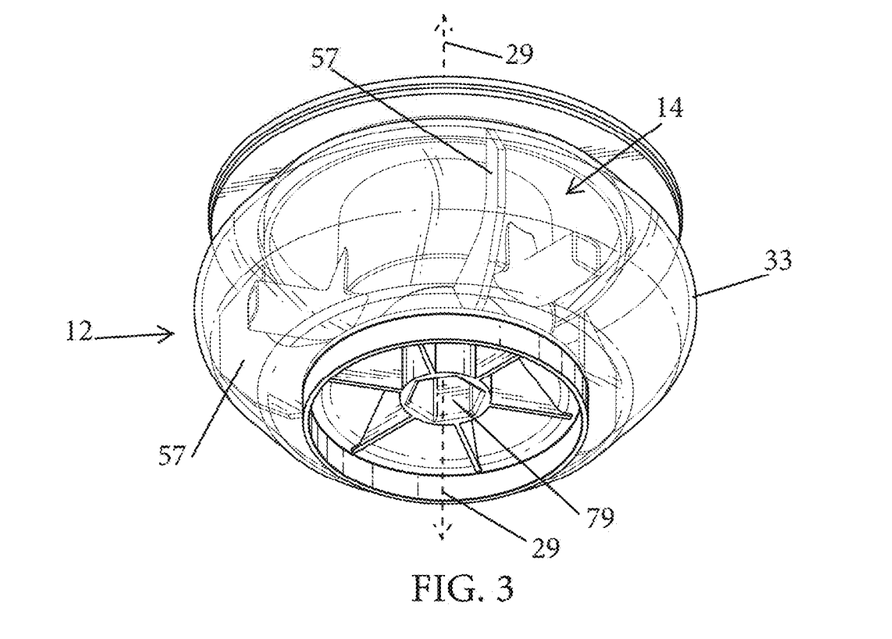
FIG. 3 is a bottom perspective view of the rotor and inlet assembly of FIG. 2.
Figure 3A:
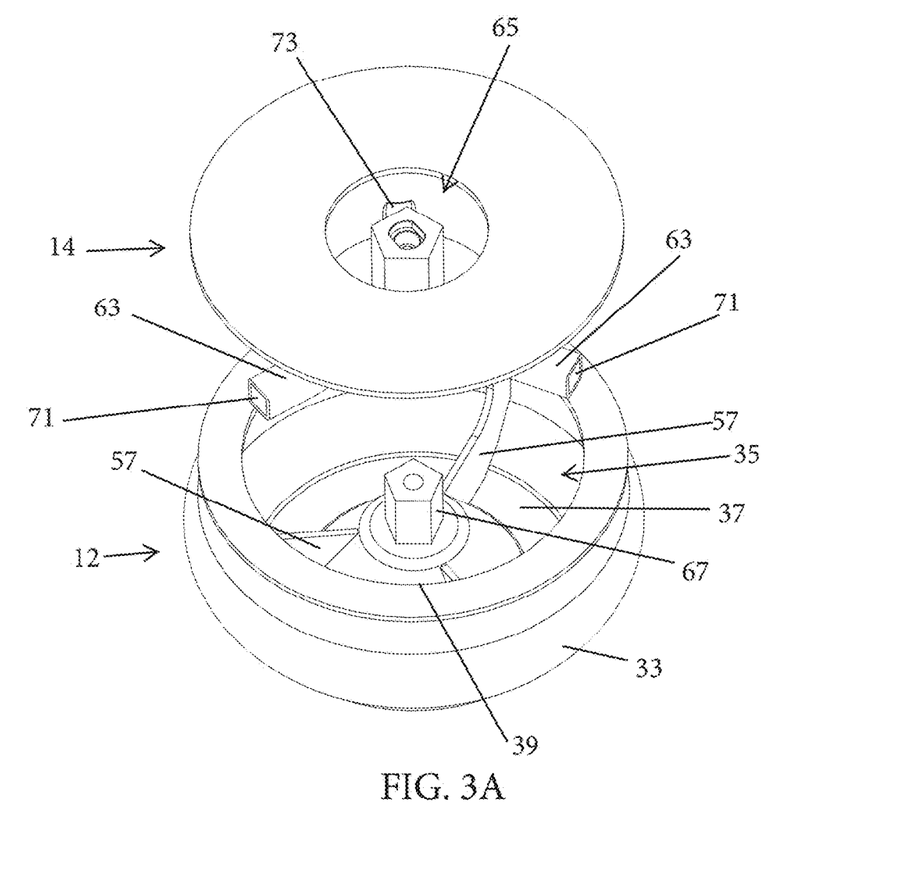
FIG. 3A is a top exploded perspective view of the rotor and inlet assembly of FIG. 2.
Figure 3B:
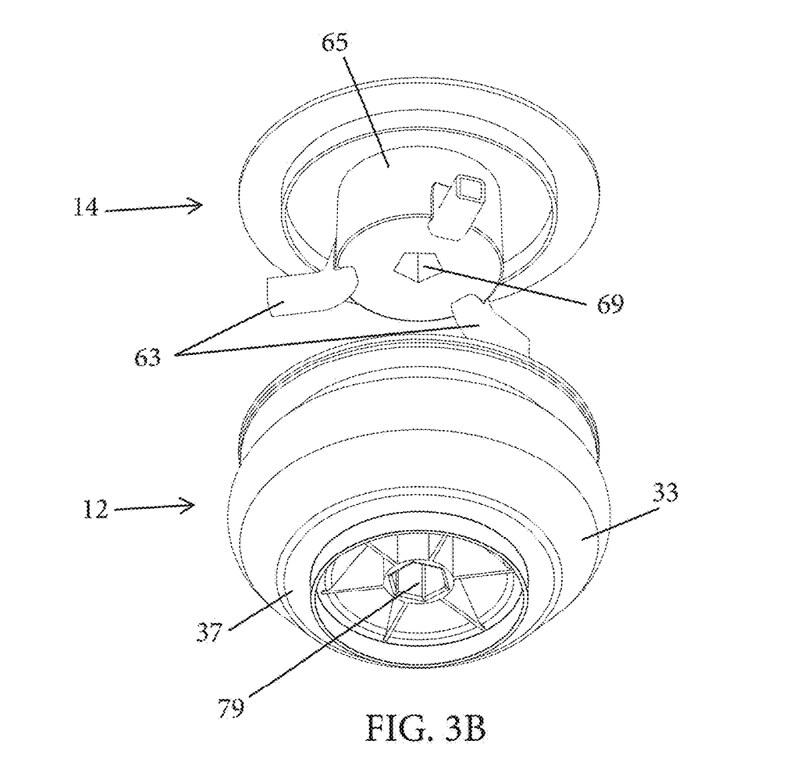
FIG. 3B is a bottom exploded perspective view of the rotor and inlet assembly of FIG. 2.

The rotor 12 can include an annular wall 33. The annular wall 33 can surround the axis of rotation 29 of the rotor 12. Referring to FIGS. 3A and 3B, the rotor 12 can have an opened end 35 (e.g., the top end, as shown in FIG. 3A) and a closed end 37 (e.g., the bottom end, as shown in FIG. 3B). The opened end 35 can be defined by a perimeter 39. The opened end 35 can define a top edge of the annular wall 33. The closed end 37 can define a bottom edge of the annular wall 33.

Figure 4:
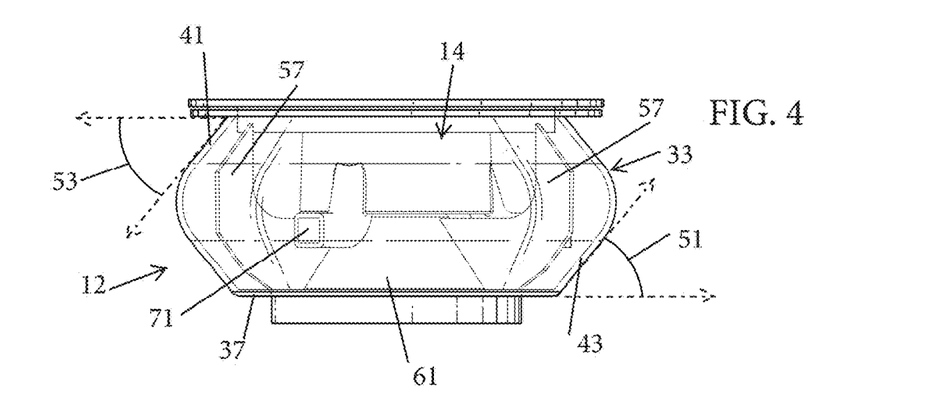
FIG. 4 is a left plan view of the rotor and inlet assembly of FIG. 2.
Figure 5:
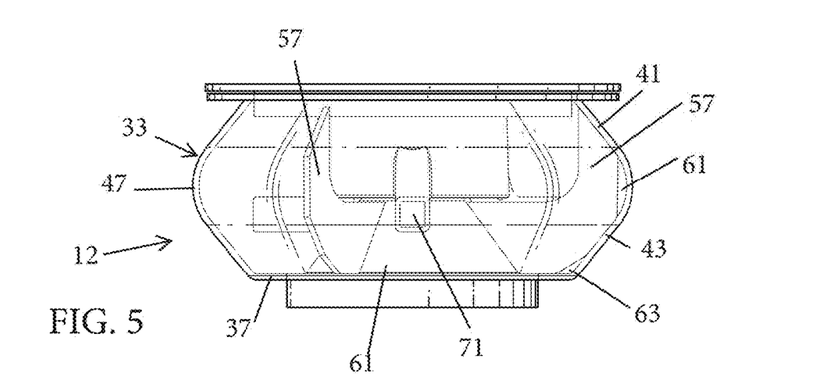
FIG. 5 is a front plan view of the rotor and inlet assembly of FIG. 2.
Figure 6:
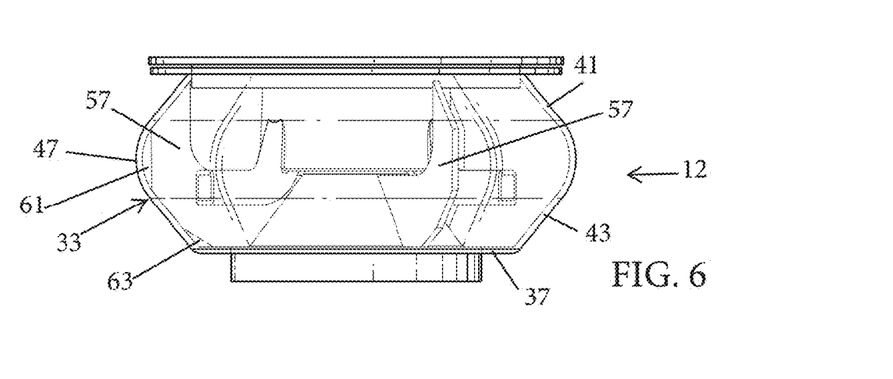
FIG. 6 is a rear plan view of the rotor and inlet assembly of FIG. 2.
Figure 7:
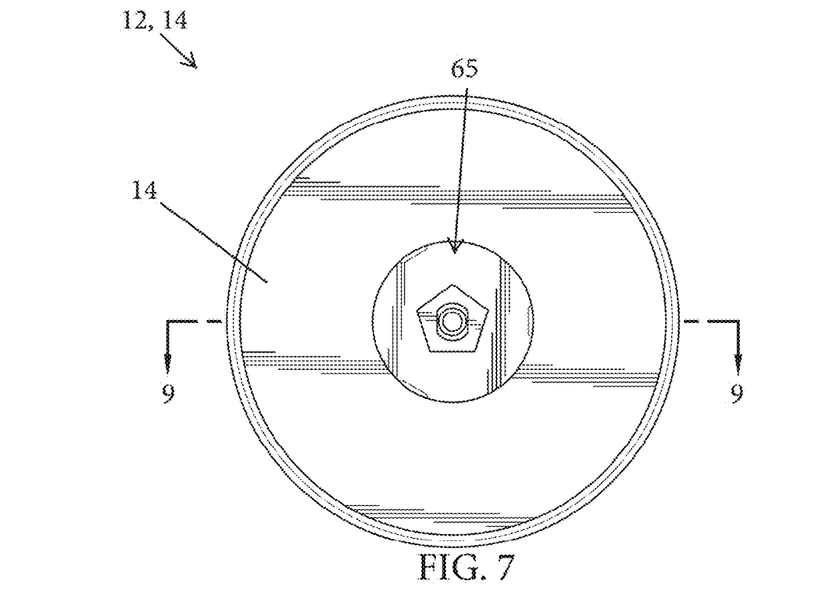
FIG. 7 is a top plan view of the rotor and inlet assembly of FIG. 2.
Figure 8:
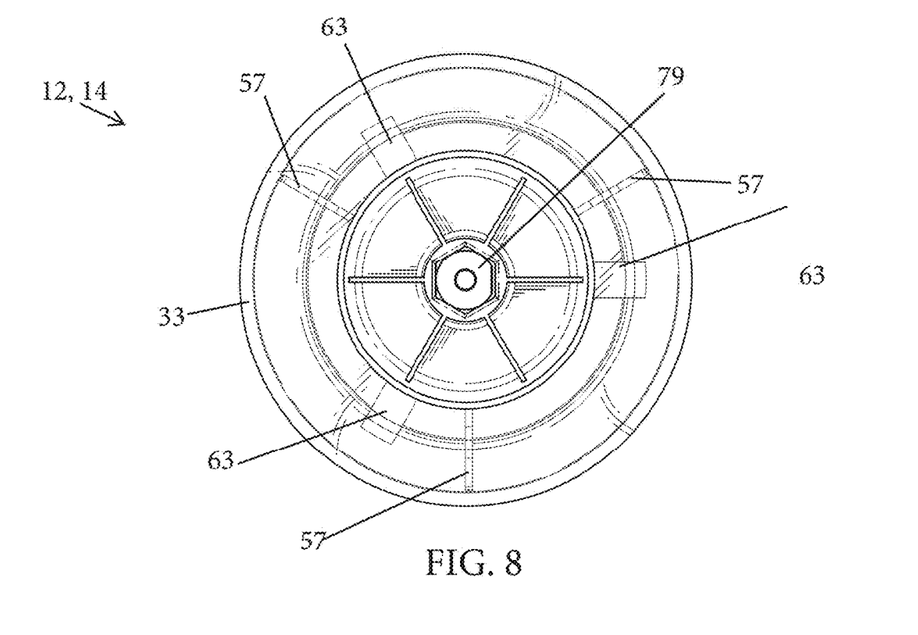
FIG. 8 is a bottom plan view of the rotor and inlet assembly of FIG. 2.

FIGS. 4-6 provide illustrative views of the shape of the annular wall 33. As illustrated, the annular wall 33 can include a top wall 41 and a bottom wall 43. A top end of the top wall 41 can be defined by the perimeter 39 of the opened end 35 and the bottom end of the bottom wall 43 can be defined by the closed end 37. In some cases, the top and bottom walls 41, 43 are co-molded or otherwise formed as a unitary part. The top and bottom walls 41, 43 can join at the bottom end of the top wall 41 and the top end of the bottom wall 43. In some embodiments, the juncture 47 is a relatively sharp point having an angle of inflection approximately equal to the sum of the angles complementary to the angles 51, 53 described below. In some embodiments, the juncture 47 is rounded. In some embodiments, the juncture 47 is a wall having a constant radius with respect to the axis of rotation 29 of the rotor 12.

In some embodiments, the juncture 47 between the top and bottom walls 41, 43, is approximately halfway (as measured along the axis of rotation 29 of the rotor 12) between the opened and closed ends 35, 37 of the rotor 12. The juncture 47 between the top and bottom walls 41, 43 can be positioned further from the axis of rotation 29 of the rotor 12 than the remaining portions of the top and bottom walls 41, 43. For example, the bottom wall 43 can extend upward and radially outward (e.g., with respect to the axis of rotation 29) from the closed end 37 of the rotor 12 at an angle 51 with respect to horizontal (e.g., with respect to a plane perpendicular to the axis of rotation 29). The top wall 41 can extend downward and radially outward (e.g., with respect to the axis of rotation 29) from the opened end 35 of the rotor 12 at an angle 53 with respect to horizontal. In some embodiments, the angles 51, 53 are approximately equal. In some embodiments, the angle 51 of the bottom wall 43 is greater than angle 53 of the top wall 41. In some embodiments, the angle 53 of the top wall 41 is greater than the angle 51 of the bottom wall 43. The angles 51, 53 of the annular wall 33 can be selected to improve the pelleting ability of the centrifuge 1. In some applications, the greatest pelleting ability is realized when the angles 51, 53 are between about 25° and about 45° from horizontal. In some embodiments, the angles 51, 53 are between about 20° and about 35°, between about 30° and about 55°, and/or between about 15° and about 65° from horizontal. In some embodiments, the angles 51, 53 of the annular wall 33 are about 51°.

The ratio of the max radius of the annular wall 33 (e.g., the radius of the juncture 47) with respect to the axis of rotation 29 to the minimum radius of the annular wall 33 (e.g., the radius of the closed end 37 of the annular wall 33) can be at least 1.1. In some embodiments, this ratio is between 1.05 and 1.5, between 1.1 and 1.4, and/or between 1.15 and 1.45. As illustrated, the ratio is approximately 1.33. Utilizing a higher ratio between the maximum radius of the annular wall 33 and the minimum radius of the annular wall 33 can increase the pelleting time of the centrifuge 1 (e.g., the time required to compact solids in the food/beverage product into a pellet that does not break up or cloud the product when the centrifuge 1 is stopped). On the other hand, utilizing a lower ratio between the maximum radius of the annular wall 33 and the minimum radius of the annular wall 33 can reduce the pelleting capacity of the rotor 12. Other factors that can affect pelleting time can include the rotational speed of the rotor 12 and/or the physical and chemical characteristics of the food/beverage product being processed.

With continued reference to FIGS. 4-6, the rotor 12 can include one or more fins 57. The fins 57 can be positioned within the rotor 12. In some embodiments, as illustrated, the fins 57 are positioned in a radially-outward portion of the rotor 12 with respect to the axis of rotation 29 of the rotor 12.

In some embodiments, the rotor 12 includes a plurality of fins 57. For example, the rotor 12 can include two or more, 4 or more, and/or 6 or more fins 57. In the illustrated embodiments, the rotor 12 includes three fins 57. The fins 57 can be distributed about the rotor 12 in a symmetric or asymmetric pattern. For example, the angular distance about the axis of rotation 29 between each fin 57 may be identical or non-identical. In the illustrated embodiment, the angular distance between each fin 57 is approximately 120°.

One or more of the fins 57 may define one or more fin gaps. For example, as illustrated, one or more of the fins 57 may define a radial fin gap 61 and/or a lower fin gap 63. The radial fin gap 61 can be, for example, a gap between the fin 57 and the juncture 47 of the rotor wall 33. In some embodiments, the lower fin gap 63 is a gap between the fin 57 and an abutment of the closed end 37 of the rotor 12 and the annular wall 33. Other gaps between the fins 57 and the closed end 37 and/or annular wall 33 are also possible. In some embodiments, one or more fins 57 have one of the gaps 61, 63 without the other. In some embodiments, one or more of the fins 57 does not include any gaps.

The one or more fins 57 may be removable from the rotor 12. In some embodiments, one or more fins 57 include attachment structure configured to releasably engage with attachment structure on the rotor 12. For example, one or more fins 57 can include a bracket, channel, clamp, protrusion, indentation, or other attachment structure configured to releasably engage with a bracket, channel, clamp, protrusion, indentation, or other attachment structure on the rotor 12. In some applications, the one or more fins 57 are formed as a unitary part with the rotor 12. For example, one or more fins 57 may be co-molded or otherwise integrally connected with the annular wall 33 and/or closed end 37 of the rotor 12. The fins 57 can be constructed from a light weight material, such as aluminum or food-grade plastic (e.g., polypropylene or polyethylene). For example, in some embodiments, each fin 57 can weigh less than or equal to about 10 grams.

Use of the one or more fins 57 can facilitate self-balancing of the rotor 12 during operation. For example, the gaps in the fins 57 can permit passage of solid, liquids, and other components of the product in a circumferential direction while reducing the likelihood that solids congregate in one portion of the annular wall 33. This self-balancing is discussed further below.

Figure 9:
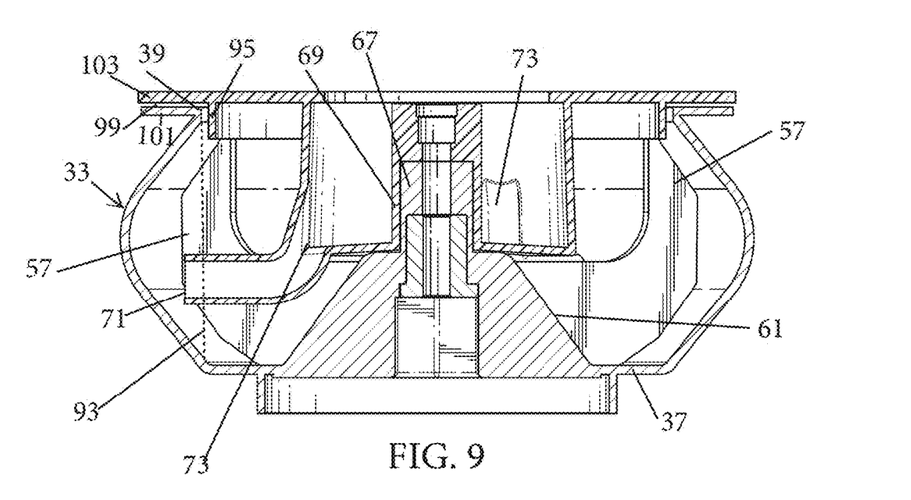
FIG. 9 is a cross-sectional view of rotor and inlet assembly of FIG. 2, taken along the cut plane 9-9 of FIG. 8.

As best illustrated in system illustration of FIG. 1B and in the rotor illustration in FIG. 9, the closed end 37 of the rotor 12 can include a projection 61. The projection 61 can extend upward from the closed end 37. In some embodiments, the projection 61 is symmetric about the axis of rotation 29 of the rotor 12. The projection 61 can have a conical, frusto-conical, hemispherical, pyramidal, or other shape. The projection 61 can be configured to encourage movement of food/beverage product toward the annular wall 33 of the rotor 12.

Figure 10:
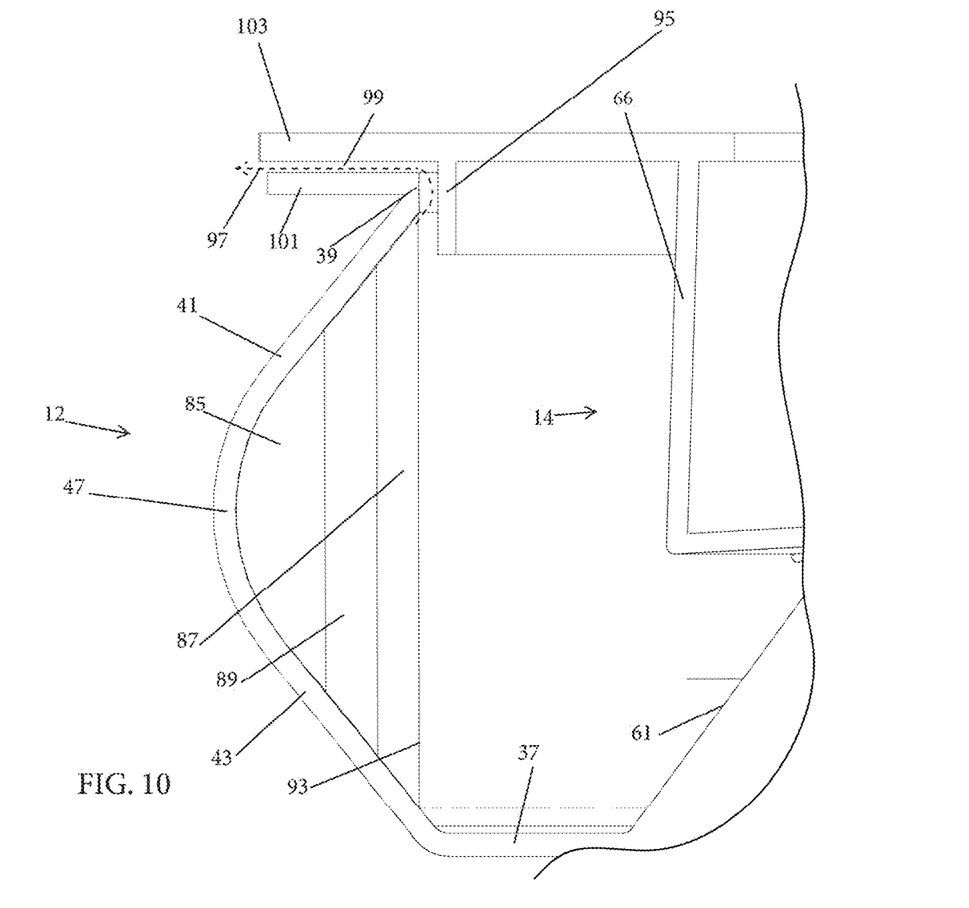
FIG. 10 is a close-up cross-section view of rotor and inlet assembly of FIG. 2, taken along the cut plane 9-9 of FIG. 8.

The exploded views provided in FIGS. 3A and 3B illustrate an embodiment of the rotor inlet assembly 14. As illustrated, the inlet assembly 14 can include one or more outlet tubes 63. The outlet tube 63 can extend from a central inlet 65. The central inlet 65 can be positioned along the axis of rotation 29 of the rotor 12 when the centrifuge 1 is assembled. Positioning the inlet of the rotor inlet assembly 14 along the axis of rotation 29 of the rotor 12 can facilitate adding food/beverage product to the rotor 12 while the rotor is spinning. In some embodiments, the central inlet 65 is symmetric about the axis of rotation 29. The central inlet 65 can include an annular wall 66 (FIG. 10). As illustrated, the annular wall 66 can taper outward away from the axis of rotation 29 from a top of the annular wall 66 toward a bottom of the annular wall 66. Such an outward taper can facilitate migration of fluid within the central inlet 65 toward the outlet tubes 63 under the force of gravity and centrifugal forces. In some embodiments, the annular wall 66 tapers inward toward the axis of rotation 29 from the top of the annular wall 66 toward the bottom of the annular wall 66. Such an inward taper can facilitate skimming or pre-separation of fluid having entrained air from the food and/or beverage product before the produce passes through the inlet tubes 63. Skimming or pre-separation of fluid having entrained air can reduce the likelihood that those portions of fluid are inadvertently ejected from the rotor 12 prior to clarification. The taper of the annular wall 66 (e.g., either the outward or inward taper) can be between about 0.5° and about 10° either toward or away from the axis of rotation 29. In some embodiments, the taper of the annular wall 66 is approximately 2°.

The inlet assembly 14 can be configured to releasably couple with the rotor 22. For example, the rotor 22 can include a projection 67 (FIG. 3A) or other mating structure configured to couple with a recess 69 or other mating structure of the inlet assembly 14. In some embodiments, the rotor 22 includes a recess 69 (FIG. 3B) configured to couple with a projection of the inlet assembly 14. The projection 67 and recess 69 can have complementary shapes. For example, the projection 67 and recess 69 can each have a polygonal, round, and/or oval-shaped cross-section. Utilizing a non-circular cross-section for the projection 67 and recess 69 can facilitate rotational locking of the inlet assembly 14 to the rotor 22. The inlet assembly 14 can be sized and shaped to facilitate insertion and removal of the inlet assembly 14 into and from the rotor without disassembly of any rotor 22 components. This feature can reduce the time required to assembly and disassemble the centrifuge 1 and can reduce the time required to clean the components of the centrifuge 1. The releasability of the inlet assembly 14 from the rotor 12 can also facilitate easier use of the centrifuge 1 without use of the inlet assembly, if desired.

In order to improve the performance and/or durability of the centrifuge, the inlet assembly 14 can be rotationally balanced. For example, the weight distribution of the inlet assembly 14 about the axis of rotation 29 of the rotor 12 can be symmetric. In some embodiments, the symmetry of the weight of the inlet assembly 14 is facilitated by symmetric distribution of the outlet tubes 63 about the axis of rotation 29. For example, as illustrated, the inlet assembly can include three outlet tubes 63 circumferentially distributed 120° apart from each other. In some embodiments, the inlet assembly 14 includes two tube 63 circumferentially distributed 180° from each other. Other numbers of outlet tubes 63

(e.g., four, five, six, seven, or more) may be used. In some embodiments, the inlet assembly 14 is constructed from a light weight material, such as aluminum or food-grade plastic. For example, the inlet assembly 14 can weigh less than or equal to about 135 grams.

As illustrated in FIG. 9, the outlet tubes 63 can extend downward and radially outward from the central inlet 65. Specifically, the outlet 71 of each outlet tube 63 can be positioned below and radially outward from the inlet 73 of each outlet tube 63. In some embodiments, an upstream portion of each outlet tube (e.g., the end closest the inlet 73) is directed downward and radially outward with respect to the axis of rotation 29 of the rotor 12 while a downstream portion (e.g., the end closest the outlet 71) is directed horizontally and radially outward with respect to the axis of rotation 29. The overall shape of the outlet tubes 63 (e.g. the direction of the upstream and downstream portions) can facilitate thorough drainage of the inlet assembly 14 into the rotor 12. In some embodiments, the overall shape of the outlet tubes facilitates positioning of the outlets 71 of the tubes in a radially outward portion of the rotor 12, as will be discussed in more detail below.

Returning to the system illustration in FIG. 1B, the centrifuge 1 can include a motor 75. The motor 75 can be configured to rotate the rotor 12 and/or inlet assembly 14. The motor 75 can be positioned within the base 3, within the outer housing 11, or partially within both the base 3 and outer housing 11. A drive shaft 77 can connect the motor 75 to one or more of the rotor 12 and inlet assembly 14. In some embodiments, one or more gears are positioned in the drive path between the motor 75 and the rotor 12. Gears can be used to increase or decrease the gear ratio between the motor 75 and rotor 12, as desired. In some embodiments, the drive shaft 77 includes keyed portions configured to rotationally lock with keyed portions of one or both of the rotor 12 and inlet assembly 14.

In order to increase the life of the motor 75, the centrifuge 1 can include one or more gaskets, seals, or other structures configured to fluidly isolate the motor 75 from the rotor 12 and/or from the interior of the outer housing 11. For example, a gasket 79 can be positioned around the drive shaft 77 beneath the rotor 12. The gasket 79 can be mated with the rotor 12 via, for example, a key fitting with a lower recess 79 (FIG. 3) of the rotor 12. In some embodiments, the inlet 65 of the rotor inlet assembly 14 includes a bushing 80 (FIG. 1B) or other structure configured to facilitate a sealed engagement of the inlet assembly 14 with the drive shaft 77.

In some embodiments, the rotor 12 and outer housing 11 include overlapping annular walls 81, 83, respectively. These overlapping annular walls 81, 83 can create a tortuous path between the interior of the outer housing 11 and the gasket 79 to inhibit fluid from the outer housing 11 from accessing the gasket 79 and motor 75. The wall 81 can, in some embodiments, extend downward from the closed end 37 of the rotor 12. The wall 83 of the outer housing 11 can extend upward from the bottom wall of the outer housing 11. As illustrated in FIG. 1B, the wall 83 of the rotor 12 can surround the wall 81 of the outer housing 11 in a direction parallel to the axis of rotation 29 of the rotor 12.

The motor 75 can be configured to receive power from a battery and/or an AC electrical connection. In some embodiments, the centrifuge 1 includes one or more electrical wires extending from the base 3 and/or from the outer housing 11. The one or more electrical wires can facilitate electrical connection of the motor 75 and/or user inputs (e.g., the switch 5) with an AC power source. In some embodiments, the centrifuge 1 does not include any external wires. For example, the centrifuge 1 can be configured operate entirely from batter power. In some embodiments, the centrifuge 1 includes solar power inputs to facilitate at least partial recharge of such a battery. In some embodiments, the centrifuges of the present disclosure will run on either 220 volts 50 hertz power or on 120 volts 60 hertz alternating current power. In some embodiments, the centrifuges can run on 12 volts direct current power and use a "wall-wart" alternating current to direct current transformer power supply (e.g., to allow the units to be used internationally).

The motor 75 may be configured to run in one or more modes of operation. For example, in response to user input and/or to input from safety features, the motor 75 can rotate the rotor 12 at a plurality of different speed and/or oscillation settings. In some embodiments, input from safety features may include a timer that automatically switches the off the motor 75 if the centrifuge 1 is left unattended beyond a predetermined time limit (e.g., a maximum spin time of 40 minutes, 50 minutes, 60 minutes, 90 minutes, or some other appropriate length of time). User input may include identification of the food/beverage product to be processed. The centrifuge 1 can be configured to modify its operating mode based upon the food/beverage product identified by the user.

In some embodiments, the centrifuge may include a processor and non-transitory memory, such as read-only memory (ROM), random access memory (RAM), or substantially persistent memory (e.g., a hard disk drive (HDD), solid state drive (SSD) or the like) (not shown FIGS. 1-1B), and be configured for programmatic operation. For example, the memory may include computer-executable instructions to control operation of the centrifuge according to user input. Illustratively, a user may be enabled to select a type and amount of product to be input, and the computer-executable instructions may execute to select an appropriate processing time for the product according to information stored in the memory, such as a table or mapping of product types and amounts to processing times. In some instances, the computer-executable instructions may alter the speed of operation of the centrifuge according to an amount or type of product (e.g., based on predetermined mappings). User input to the processor may be obtained via any number of inputs, such as an input device (e.g., a touch screen) or a network interface (e.g., an wired Ethernet interface, a wireless network interface according to any number of known wireless protocols, such as "WI-FI™" protocols (standardized under the IEEE 802.11 family), BLUETOOTH™ protocols, etc.) either included within or in communication with the centrifuge. In one embodiment, the centrifuge may be connected, via a network, to an external data store of information mapping processing parameters (e.g., speed or processing time) to types or amounts of inputs. Accordingly, the centrifuge may communicate with the external data store to retrieve appropriate processing parameters, or may submit proposed processing parameters to the data store for retrieval by other centrifuges (or users of such centrifuges).

In some instances, a processor may execute computer-executable instructions to receive feedback regarding operation of the centrifuge, and to vary further operation in accordance with the feedback. For example, the centrifuge may be configured with a rotational speed monitor and/or monitors to the operation of a motor, and may the processor may be configured to vary further operation based on a speed of rotation or current load on a motor. Illustratively, speed of rotation or motor load may vary according to a current state of contents of the centrifuge, in response to changes to the moment of inertia (also known as "angular mass") as various densities of product are redistributed in the centrifuge. In one embodiment, a processor may utilize computer executable instructions to determine a current moment of inertia in the rotor from sensor data, and to estimate a level of separation of product in the rotor according to the moment of inertia (or directly from sensor data). The processor may then halt rotation of the rotor when a desired level of separation is reached. In one embodiment, the processor may determine that separation of particulate has completed when the moment of inertia, motor load, or rotational speed ceases to change over time. In another embodiment, the processor may implement "fuzzy logic", algorithms for which are known in the art, in conjunction with the moment of inertia, motor load, or rotational speed to determine a state of separation of particulate from a liquid or striation of the liquid.

The motor 75 can be configured to operate over a range of speeds. For example, the motor 75 can rotate the rotor 12 at speeds over a range of 0-8,000 revolutions per minute (RPM). In some applications, the motor 75 is configured to oscillate the RPM of the rotor 12 between over a range of 50-200 RPM over the course of a predetermined period of time (e.g., 30 seconds, one minute, two minutes, or some other appropriate time frame) when the rotor 12 spins at a top speed of 4,000-8,000 RPM. Other broader ranges of oscillation may also be utilized. Non-oscillating speed patterns may be utilized by the motor 75 to rotate the rotor 12. Variation of the rotational speed of the rotor 12 may be constant or periodic. Varying the speed of the rotor 12 can provide a number of benefits including, but not limited to, reduction of vibration of the rotor, reduction of noise, increased motor life (e.g., as a result at least of reduction of vibration), increased evenness of distribution of solids around the perimeter of the annular wall 33, and/or improvement in pelleting ability of the centrifuge 1.

Methods of assembling the centrifuges of the present disclosure can include providing a pre-assembled base 3. The base 3 may include the motor 75, drive shaft 77, wiring, user input controls, and/or other components. The method can include connecting the outer housing 11 to the base 3. The rotor 12 can be inserted into the outer housing 11 before, during, or after connection of the outer housing 11 with the base 3. In some embodiments, the method includes inserting the one or more fins 57 into the rotor 12. The rotor input assembly 14 may be inserted at least partially into the rotor 12 before, during, or after inserting the rotor 12 into the outer housing 11. In some applications, the input assembly 14 is not connected to or inserted into the rotor 12 prior to use of the centrifuge 1. The lid 15 may be connected to the outer housing 11 upon insertion of the rotor 12. Insertion of the rotor 12 into the outer housing 11 and insertion of the rotor input assembly 14 into the rotor 12 may be performed without disassembly of the outer housing 11 and rotor 12, respectively. In some embodiments, the feed tube 21 and/or fill cap 23 are inserted into the lid inlet 19 and/or into the rotor 12. Connection of the outer housing 11 to the base may require passage of the drive shaft 77 through a portion of the outer housing 11. In some embodiments, insertion of the rotor/inlet assembly 12, 14 into the outer housing 11 can require passage of the drive shaft 77 through one or more apertures of the rotor 12 and/or inlet assembly 14.

Methods of using the centrifuge 1 to process a food/beverage product can include input of the product into the rotor 12. This step can include use of the pump 17 and feed tube 21. In some applications, a user may manually input product into the rotor 12 either before or after the rotor 12 is positioned within the outer housing 11.

The motor 75 can be used to rotate the rotor 12 and inlet assembly 14 prior to, during, and/or after product is input into the rotor 12. For example, a user may add product to the rotor 12 during operation of the centrifuge 1 in a continuous or discretized rate.

During operation of the centrifuge 1, solids and other particulates within the product will tend to move radially outward with respect to the axis of rotation 29 and congregate along the inner surface of the annular wall 33 at or near the juncture 47. As illustrated in the close up view of FIG. 10, the particulates can form a pellet 85 at or near the juncture 47. Clarified liquid 87, on the other hand, will tend to remain radially inward from the pellet 85. Depending on the product being processed, one or more intermediate components 89 may form between the clarified liquid 87 and the pellet 85.

Staying with FIG. 10, when the operational capacity of the rotor 12 (e.g., the volume measured radially between the radial position 93 of the perimeter 39 of the opened end 35 of the rotor 12 and the juncture 47 of the rotor 12) is exceeded, the clarified fluid 87 closest to the axis of rotation 29 can "spill" out of the rotor 12. For example, the clarified fluid 87 can exit the rotor between the perimeter 39 and a portion of the inlet assembly 14 (e.g., a rim 95 projected into the rotor 12). The spill path 97 of the clarified liquid can continue through the opened end 35 of the rotor 12 and then radially outward through a gap 99 between a radial upper lip 101 of the rotor 12 and a radial outward lip 103 of the inlet assembly 14. Utilization of the lips 101, 103 to create a narrow outlet path can reduce the likelihood of inadvertently discharging unclarified liquids from the rotor 12. For example, the lips 101, 103, rim 95, and/or perimeter 39 of the opened end 35 of the rotor 12 can reduce the likelihood of inadvertent shearing unprocessed food/beverage product due to the relative velocity different between the air and product with the rotor 12 and the air in the outer housing 11. As illustrated, the lip 103 of the inlet assembly 14 can extend radially past the lip 101 of the rotor 12 with respect to the axis of rotation 29. In some such configurations, evaporation of liquids (e.g., alcohols and other liquids) from the rotor 12 can be reduced during rotation of the rotor 12. In some embodiments, the rotor 12 and inlet assembly 14 do not include the lips 101, 103. In some such configurations, evaporations of liquids from the rotor 12 are thus encouraged during rotation of the rotor 12. In some embodiments, the lip 103 and/or rim 95 of the inlet assembly 14 are removable from the remainder of the inlet assembly 14.

Product may be continually or incrementally fed into the rotor 12 until the level of the pellet 85 or intermediate product 89 reaches the radial position 93 of the perimeter 39 of the opened end 35 of the rotor 12. The operational volume (e.g., the volume of the rotor 12 radially outward from the perimeter 39 of the opened end 35) can be at least 500 ml, at least 600 ml, at least 700 ml and/or at least 750 ml (other capacities are possible). The operational volume can correspond to the volume of liquid held by the stationary rotor 12 when filled to the top end of the fins 57. The centrifuge 1 can be configured to process at least 1 liter, at least 2 liters, at least 3 liters, and/or at least 5 liters of product every 15 minutes in continuous mode wherein product is continually fed into the rotor 12 either manually or via a pump 17.

The motor 75 can be configured to utilize a "soft start" wherein the rotation rate of the rotor is slowly increased over a period of time such as 30 seconds, a minute, or some other suitable time. Utilizing a soft start can reduce stress on the rotor and/or inhibit splashing of the product in the rotor 12. In some embodiments, the motor 75 utilizes a "soft stop"

wherein the rotation rate of the rotor 12 is gradually slowed over a period of time such as 30 second, a minute, or some other suitable time. Utilizing a soft stop can reduce stress on the rotor 12 and reduce the likelihood of causing cloudiness (e.g., redistribution of particulates in the liquid substrate of the product) in the product. In some embodiments, the centrifuge 1 is configured to operate quieter than 65 dB, quieter than 55 dB, and/or quieter than 75 dB at one meter from the centrifuge 1.

As mentioned above, the fins 57 of the rotor can operate to balance the rotor 12 when the rotor 12 is spinning. Specifically, the gaps in the fins 57 can permit passage of product in a limited manner past the fins 57 can permit thickened materials to distribute around the circumference of the annular wall 33. In some applications, use of a blocked fin 57 (e.g., a fin 57 without gaps) can reduce the likelihood of imbalance when using a thin product that would otherwise pass quickly through the gaps in the fins 57. In some cases, the user of fins 57 can reduce or eliminate scouring of the pellet by the clarified or semi-clarified liquid.

Returning to the cross-sectional view in FIG. 9, the outlets 71 of the outlet tubes 63 can be positioned radially outward from the radial position 93 of the perimeter 39 of the opened end 35 of the rotor 12. Such positioning of the outlets 71 of the tube 63 can reduce the likelihood that unclarified liquid inadvertently spills out of the rotor 12.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

For expository purposes, the term "horizontal" as used herein is defined as a plane parallel to the plane or surface of the floor of the area in which the device being described is used or the method being described is performed, regardless of its orientation. The term "floor" floor can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A centrifuge for separating food and beverage products, the centrifuge comprising:
    a base;
    an outer housing connected to a top end of the base, the outer housing including;
        an outer housing wall having a top end and a bottom end; and
        an outlet through the outer housing wall at the bottom end of the outer housing wall;
    a rotor positioned within the outer housing, the rotor including:
        an axis of rotation;
        an annular rotor wall surrounding the axis of rotation;
        an opened top end, the opened top end having a perimeter defining an upper end of the annular rotor wall; and
        a closed bottom end defining a lower end of the annular rotor wall; and
    a motor operably connected to the rotor and configured to rotate the rotor about the axis of rotation at oscillating rotational speeds;
    wherein the annular rotor wall extends upward and radially outward with respect to the axis of rotation from the lower end of the annular rotor wall, wherein the annular rotor wall extends downward and radially outward with respect to the axis of rotation from the upper end of the annular rotor wall.

2. The centrifuge of claim 1, further comprising an inlet assembly configured to releasably connect to the rotor and positioned at least partially within the rotor when connected to the rotor, the inlet assembly including:
    a central inlet positioned along the axis of rotation of the rotor when the inlet assembly is connected to the rotor; and
    at least one outlet tube in fluid communication with the central inlet and extending away from the axis of rotation beyond the perimeter of the opened top end of the rotor;
    wherein the inlet assembly is rotationally locked to the rotor when connected to the rotor.

3. The centrifuge of claim 2, wherein the inlet assembly is removable from and insertable into the rotor without disassembly of the rotor.

4. The centrifuge of claim 1, wherein the outer housing comprises a bottom wall connected to the bottom end of the outer housing wall, and wherein the bottom wall slopes upward from the outer housing wall toward the axis of rotation of the rotor.

5. The centrifuge of claim 1, wherein the rotor includes an annular wall projected downward from the closed bottom end of the rotor, wherein the outer housing includes an annular wall extending upward from the bottom wall of the outer housing, wherein the annular walls of the rotor and outer housing overlap each other in a direction parallel to the axis of rotation, and wherein the annular wall of the outer housing is positioned within the annular wall of the rotor.

6. The centrifuge of claim 1, further comprising a lid configured to connect with the top end of the outer housing wall, the lid comprising a lid inlet providing access into the outer housing when the lid is connected with the top end of the outer housing wall.

7. The centrifuge of claim 6, wherein the lid inlet is positioned along the axis of rotation of the rotor when the lid is connected to the top end of the outer housing wall.

8. The centrifuge of claim 6, wherein the centrifuge includes a sensor configured to prevent operation of the motor if the lid is not fully connected to the top end of the outer housing.

9. A centrifuge for separating food and beverage products, the centrifuge comprising:
- a base;
- an outer housing connected to a top end of the base, the outer housing including;
  - an outer housing wall; and
  - a spout extending through a lower portion of the outer housing wall;
- a rotor positioned within the outer housing, the rotor including:
  - an axis of rotation;
  - an upper annular rotor wall surrounding the axis of rotation and having a top end and a bottom end;
  - a lower annular rotor wall surrounding the axis of rotation and having a bottom end and a top end connected to the bottom end of the upper annular rotor wall;
  - an opened top end, the opened top end having a perimeter defining an upper end of the upper annular rotor wall; and
  - a closed bottom end defining a lower end of the lower annular rotor wall;
- an inlet assembly positioned at least partially within the rotor and rotationally synced with the rotor, the inlet assembly including a central inlet positioned along the axis of rotation of the rotor; and
- a motor operably connected to the rotor and configured to rotate the rotor about the axis of rotation, the motor configured to increase and decrease the rotational speed of the rotor in an oscillating pattern;
- wherein the bottom end of the upper rotor wall is positioned further from the axis of rotation than the top end of the upper rotor wall.

10. The centrifuge of claim 9, wherein the central inlet of the inlet assembly includes an annular wall, and wherein the annular wall tapers toward the axis or rotation of the rotor from the top of the annular wall to the bottom of the annular wall.

11. The centrifuge of claim 9, wherein the inlet assembly includes at least one outlet tube in fluid communication with the central inlet and extending away from the axis of rotation beyond the perimeter of the opened top end of the rotor such that an outlet of the outlet tube is positioned further from the axis of rotation than the perimeter of the opened top end of the rotor.

12. The centrifuge of claim 11, wherein the at least one outlet tube include an upstream portion and a downstream portion, and wherein the upstream portion extends downward and radially outward from the central inlet with respect to the axis of rotation of the rotor.

13. The centrifuge of claim 12, wherein the downstream portion extends horizontally and radially outward from the upstream portion with respect to the axis of rotation of the rotor.

14. The centrifuge of claim 9, further comprising a pump, the pump configured to pump food and beverage products into the rotor.

15. The centrifuge of claim 14, wherein the pump is a peristaltic pump.

16. The centrifuge of claim 14, further comprising a feed tube connected to the pump and configured to direct the food and beverage product into the rotor.

* * * * *